United States Patent
Hamada

(10) Patent No.: US 8,885,187 B2
(45) Date of Patent: Nov. 11, 2014

(54) IMAGE PROCESSING SYSTEM

(71) Applicant: Ryoh Hamada, Osaka (JP)

(72) Inventor: Ryoh Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 207 days.

(21) Appl. No.: 13/662,121

(22) Filed: Oct. 26, 2012

(65) Prior Publication Data
US 2013/0120780 A1 May 16, 2013

(30) Foreign Application Priority Data
Nov. 14, 2011 (JP) ................................. 2011-248291

(51) Int. Cl.
*G06K 15/00* (2006.01)
*G06F 3/12* (2006.01)
*G03G 15/00* (2006.01)

(52) U.S. Cl.
CPC ............ *G06F 3/1221* (2013.01); *G06F 3/1288* (2013.01); *G03G 15/5083* (2013.01); *Y02B 60/1271* (2013.01); *G03G 15/5004* (2013.01); *G06F 3/124* (2013.01)
USPC ........ 358/1.13; 358/1.14; 358/1.15; 358/1.16

(58) Field of Classification Search
USPC .............. 358/1.13, 1.14, 1.15, 1.16; 709/229; 710/23
See application file for complete search history.

(56) References Cited

U.S. PATENT DOCUMENTS

| 5,915,148 | A | 6/1999 | Hamaguchi et al. |
| 8,031,350 | B2 * | 10/2011 | Ohara ........................... 358/1.14 |
| 8,054,494 | B2 * | 11/2011 | Takahashi et al. ............ 358/1.15 |
| 8,149,438 | B2 * | 4/2012 | Morales et al. .............. 358/1.15 |
| 8,214,686 | B2 * | 7/2012 | Ueda ............................... 714/15 |
| 2003/0107764 | A1 | 6/2003 | Takei |
| 2008/0188993 | A1 | 8/2008 | Ikusawa |

FOREIGN PATENT DOCUMENTS

| JP | 11-17875 A | 1/1999 |
| JP | 2003-108342 A | 4/2003 |
| JP | 2003-177895 A | 6/2003 |
| JP | 2006-172257 A | 6/2006 |
| JP | 2008-192037 A | 8/2008 |

* cited by examiner

*Primary Examiner* — Allen H Nguyen
(74) *Attorney, Agent, or Firm* — Birch, Stewart, Kolasch & Birch, LLP

(57) ABSTRACT

An image processing system includes a server computer and a plurality of image processing apparatuses communicable with the server computer. The server computer has a function of causing the plurality of image processing apparatuses to execute one job in a shared manner, and if power supply/demand situation is good, it causes the plurality of image processing apparatuses to execute one job in a shared manner, and if the power supply/demand situation is tight, it excludes at least one of the image processing apparatuses and causes the remaining image processing apparatuses to execute one job in a shared manner. This reduces power consumption of the image processing system while it is possible to cause a plurality of image processing apparatuses to execute one job such as a cluster printing job.

5 Claims, 10 Drawing Sheets

FIG.6

| 2011/xx/xx 20:20 UPDATE | | | | |
|---|---|---|---|---|
| ON-PEAK POWER AVAILABILITY (10MW) | TIME ZONE | | | |
| 2600 | 13:00~17:00 | | | |
| EXPECTED MAXIMUM POWER CONSUMPTION (10MW) | | | | |
| 2360 | 14:00~15:00 | | | |
| USAGE RATE(%) | | | | |
| 91 | | | | |
| DATE | TIME | ACTUAL VALUE TODAY (10MW) | EXPECTED VALUE (10MW) | ACTUAL VALUE YESTERDAY (10MW) |
| 2011/xx/xx | 0:00 | 1539 | 0 | 1461 |
| 2011/xx/xx | 1:00 | 1456 | 0 | 1381 |
| 2011/xx/xx | 2:00 | 1453 | 0 | 1391 |
| 2011/xx/xx | 3:00 | 1483 | 0 | 1435 |
| 2011/xx/xx | 4:00 | 1474 | 0 | 1431 |
| 2011/xx/xx | 5:00 | 1442 | 0 | 1379 |
| ⋮ | ⋮ | ⋮ | ⋮ | ⋮ |
| 2011/xx/xx | 18:00 | 2353 | 0 | 2142 |
| 2011/xx/xx | 19:00 | 2294 | 0 | 2097 |
| 2011/xx/xx | 20:00 | 0 | 0 | 1978 |
| 2011/xx/xx | 21:00 | 0 | 0 | 1871 |
| ⋮ | ⋮ | ⋮ | ⋮ | ⋮ |

FIG.7

| ON-PEAK POWER AVAILABILITY TOMORROW(10MW) | TIME ZONE |
|---|---|
| 2540 | 13:00~17:00 |
| EXPECTED MAXIMUM POWER CONSUMPTION TOMORROW(10MW) | TIME ZONE |
| 2210 | 14:00~15:00 |
| USAGE RATE TOMORROW(%) | |
| 87 | |

FIG.8

| DATE | TIME | MOMENTARY VALUE(10MW) |
|---|---|---|
| 2011/9/9 | 0:00 | 1598 |
| 2011/9/9 | 0:03 | 1591 |
| 2011/9/9 | 0:06 | 1589 |
| 2011/9/9 | 0:09 | 1575 |
| 2011/9/9 | 0:12 | 1561 |
| 2011/9/9 | 0:15 | 1569 |
| 2011/9/9 | 0:18 | 1561 |
| 2011/9/9 | 0:21 | 1554 |
| 2011/9/9 | 0:24 | 1549 |
| 2011/9/9 | 0:27 | 1531 |
| 2011/9/9 | 0:30 | 1530 |
| 2011/9/9 | 0:33 | 1526 |
| ⋮ | ⋮ | ⋮ |
| 2011/9/9 | 19:33 | 2283 |
| 2011/9/9 | 19:36 | 2271 |
| 2011/9/9 | 19:39 | 2265 |
| 2011/9/9 | 19:42 | 2260 |
| 2011/9/9 | 19:45 | 2256 |
| 2011/9/9 | 19:48 | 2253 |
| 2011/9/9 | 19:51 | 2248 |
| 2011/9/9 | 19:54 | 2232 |
| 2011/9/9 | 19:57 | 2220 |
| 2011/9/9 | 20:00 | 2209 |
| 2011/9/9 | 20:03 | 2205 |
| 2011/9/9 | 20:06 | 2212 |
| 2011/9/9 | 20:09 | 2199 |
| 2011/9/9 | 20:12 | |
| ⋮ | ⋮ | ⋮ |

IMAGE PROCESSING SYSTEM

CROSS-REFERENCE TO RELATED APPLICATIONS

This nonprovisional application claims priority under 35 U.S.C. §119(a) on Patent Application No. 2011-248291 filed in Japan on Nov. 14, 2011, the entire contents of which are hereby incorporated by reference.

BACKGROUND OF THE INVENTION

1. Field of the Invention

The present invention relates to an image processing system capable of appropriately cope with unstable power supply.

2. Description of the Background Art

As one type of image processing apparatuses as electronic equipment, an image forming apparatus (typically a copy machine) for forming an image on a sheet of recording paper has been introduced to many places of business (companies and offices). In such a place of business, it is a common practice to have an image forming apparatus having a printer function or copy function connected to a network and to share the apparatus by a plurality of users. An MFP (MultiFunction Peripheral) as one type of such image forming apparatuses has a plurality of basic operational modes including a copy mode, a facsimile mode (hereinafter facsimile will be also denoted as FAX), a network compatible printer mode and a scanner mode.

Recently, in places of business, increase in power consumption resulting from use of personal computers (also referred to as PCs) allocated to each person and installation of a large number of electronic apparatuses including a plurality of MFPs has come to be a cause of concern. To meet the demand of energy saving, power consumption of each apparatus as a single body has been reduced, for example, by improving specifications of each electronic apparatus, including the MFP.

A conventional image processing apparatus is basically designed on the premise of stable power supply. By way of example, a function of distributing one print job to a plurality of MFPs (hereinafter also referred to as "cluster printing") to increase apparent speed of output, a power saving function and so on are all proposed taking it for granted that power supply is always stable. Different from a note type PC or a portable terminal provided with a battery, for an image processing apparatus, it has been unnecessary to consider any special measure to cope with low battery, or to prepare for expected power outage time, and practically such measures have not been taken.

Considering electricity supply situations of late, however, the stable power supply that has been long taken for granted (guaranteed) may no longer be realistic. Possibility of reduction in power supply or interruption of power supply (outage) is no longer negligible. Public restriction of power use (for example, planned outage) has actually been enforced. Conventional energy-saving measures taken in each apparatus is insufficient to cope with such a situation. Therefore, it has been desired to implement appropriate measures in each image processing apparatus as well as to appropriately manage and control a plurality of image processing apparatuses with limited power supply, in order to prevent problems such as abrupt outage caused by power shortage.

By way of example, Japanese Patent Laying-Open No. 11-17875 (hereinafter referred to as '875 Reference) discloses a technique of shifting timing of power-on, in order to prevent a plurality of copy machines of one floor from simultaneously entering warm-up mode. This approach reduces influences on the power supply voltage and, though for a short period of time, power consumption can be reduced.

In connection with the cluster printing using a plurality of image processing apparatuses simultaneously, Japanese Patent Laying-Open No. 2003-177895 (hereinafter referred to as '895 Reference) discloses a technique of solving a problem of image missing experienced when one print job is divided and output by a plurality of image forming apparatuses, if speed of data transfer from a print server to image forming apparatuses is slower than the printing speed of the image forming apparatuses. According to this technique, the print job is divided anew to reduce the number of image forming apparatuses to be used.

As described above, it is necessary to implement appropriate measures in each image processing apparatus to prevent problems such as abrupt outage caused by power shortage. Further, it is necessary to appropriately manage and control a plurality of image processing apparatuses. If cluster printing is to be done with priority given on the speed of output, a plurality of image processing apparatuses are used simultaneously and, therefore, power consumption increases whereas the processing time becomes shorter. This is also true whenever one job is executed using a plurality of image processing apparatuses, not only in the case of cluster printing. Therefore, measures to cope with reduced power supply are particularly necessary when one job is executed using a plurality of image processing apparatuses.

The cluster printing, in which one job is executed by a plurality of image forming apparatuses simultaneously, however, is not considered in '875 Reference. Further, '895 Reference has no consideration of abrupt outage caused by unstable state of power demand/supply or a situation in which sufficient power supply to a plurality of image forming apparatuses is difficult.

In view of the problems described above, it is desirable to provide an image processing system capable of appropriately cope with a situation of unstable power supply such as reduction of power supply, and capable of appropriately processing a job that uses a plurality of image processing apparatus such as a cluster printing job.

SUMMARY OF THE INVENTION

According to an aspect, the present invention provides an image processing system, including: a server computer; a plurality of image processing apparatuses communicable with the server computer; an information obtaining unit for obtaining information related to power supply/demand situation supplied from outside; and a determining unit determining power supply/demand situation, using the information obtained by the information obtaining unit. The server computer has a function of causing the plurality of image processing apparatuses to execute one job in a shared manner; if it is determined by the determining unit that the power supply/demand situation is not tight, the server computer causes the plurality of image processing apparatuses to execute the one job in a shared manner; and if it is determined by the determining unit that the power supply/demand situation is tight, the server computer excludes at least one of the plurality of image processing apparatuses and causes the remaining image processing apparatuses to execute the one job in a shared manner.

Preferably, at least one of the image processing apparatuses suspends at least part of its functions if it is determined by the determining unit that power supply/demand situation is tight.

More preferably, at least one of the image processing apparatuses includes: a plurality of internal units for executing a job; a power supply unit for supplying power to the plurality of internal units; and a suspending unit causing the power supply unit to suspend power supply to at least one of the plurality of internal units if it is determined by the determining unit that power supply/demand situation is tight; and suspension of at least part of the functions in at least one of the image processing apparatuses is realized by the suspension of power supply to the internal unit by the suspending unit.

Preferably, if at least one of the image processing apparatuses receives, with at least part of its functions being in a suspended state, an instruction to execute the one job in a shared manner from the server computer, it transmits unavailability information indicating that sharing of the one job is impossible to the server computer, or transmits at least a part of the one job which has been allocated to the at least one of the image processing apparatuses to be executed in a shared manner to at least one of the remaining image processing apparatuses.

Preferably, receiving the unavailability information, the server computer causes at least one of the remaining image processing apparatuses to execute a part of the one job which was to be shared by at least one of the image processing apparatuses that transmitted the unavailability information.

More preferably, at least one of the image processing apparatuses is determined such that total power consumption by the remaining image processing apparatuses does not exceed a prescribed value.

More preferably, at least one of the image processing apparatuses is determined such that total power consumption by the remaining image processing apparatuses is minimized under prescribed conditions.

Preferably, each of the plurality of image processing apparatuses suspends at least part of its functions if it is determined by the determining unit that the power supply/demand situation is tight; if each of the plurality of image processing apparatuses suspends at least part of its function and execution of the one job becomes impossible, the server computer temporarily withholds execution of the one job; and after at least two of the image processing apparatuses restarted the suspended functions, the server computer causes the image processing apparatuses that restarted the suspended functions to execute the one job in a shared manner.

More preferably, after assigning the one job to all of a plurality of image processing apparatuses and instructing to execute the one job in a shared manner, if it is determined by the determining unit that power supply/demand situation is tight, the server computer causes at least part of the plurality of image processing apparatuses to suspend the shared execution of the one job.

The image processing apparatus in accordance with the present invention includes: an information obtaining unit obtaining information related to power supply/demand situation supplied from outside; and a determining unit determining the power supply/demand situation based on the information obtained by the information obtaining unit. The image processing apparatus includes: a plurality of internal units for executing a job; a power supply unit for supplying power to the plurality of internal units; and a suspending unit causing the power supply unit to suspend power supply to at least one of the plurality of internal units, if it is determined by the determining unit that power supply/demand situation is tight.

According to the present invention, even in a tight power supply/demand situation where stable power supply is difficult, it is possible to have one job executed by a plurality of image processing apparatuses. Specifically, power consumption of the image processing system is reduced, while it is possible to have a job such as the cluster printing job executed by a plurality of image processing apparatuses.

Since each image processing apparatus is provided with the information obtaining unit obtaining information related to power supply/demand situation supplied from outside and a determining unit determining the power supply/demand situation using the information obtained by the information obtaining unit, it is possible in each image processing unit to appropriately cope with the tight power supply/demand situation where stable power supply is difficult. Specifically, power supply to an internal unit that consumes much power (such as a fixing unit used for forming an image on a sheet of recording paper) or to the plurality of internal units as a whole is suspended, whereby the power consumption can be reduced.

If a specific image processing apparatus cannot execute a part of the job assigned from the server computer, the server computer causes another image processing apparatus to execute that part of the job and, hence, the job can be executed efficiently. If a specific image processing apparatus cannot execute a part of the job assigned from the server computer, the image processing apparatus may transmit and cause another image processing apparatus to execute that part of the job and, hence, the job can be executed efficiently.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows an example of power supply/demand information of one day.

FIG. 7 shows an example of power supply/demand information of the next day.

FIG. 8 shows an example of power supply/demand information provided at a short time interval.

DESCRIPTION OF THE PREFERRED EMBODIMENTS

Figure 1:
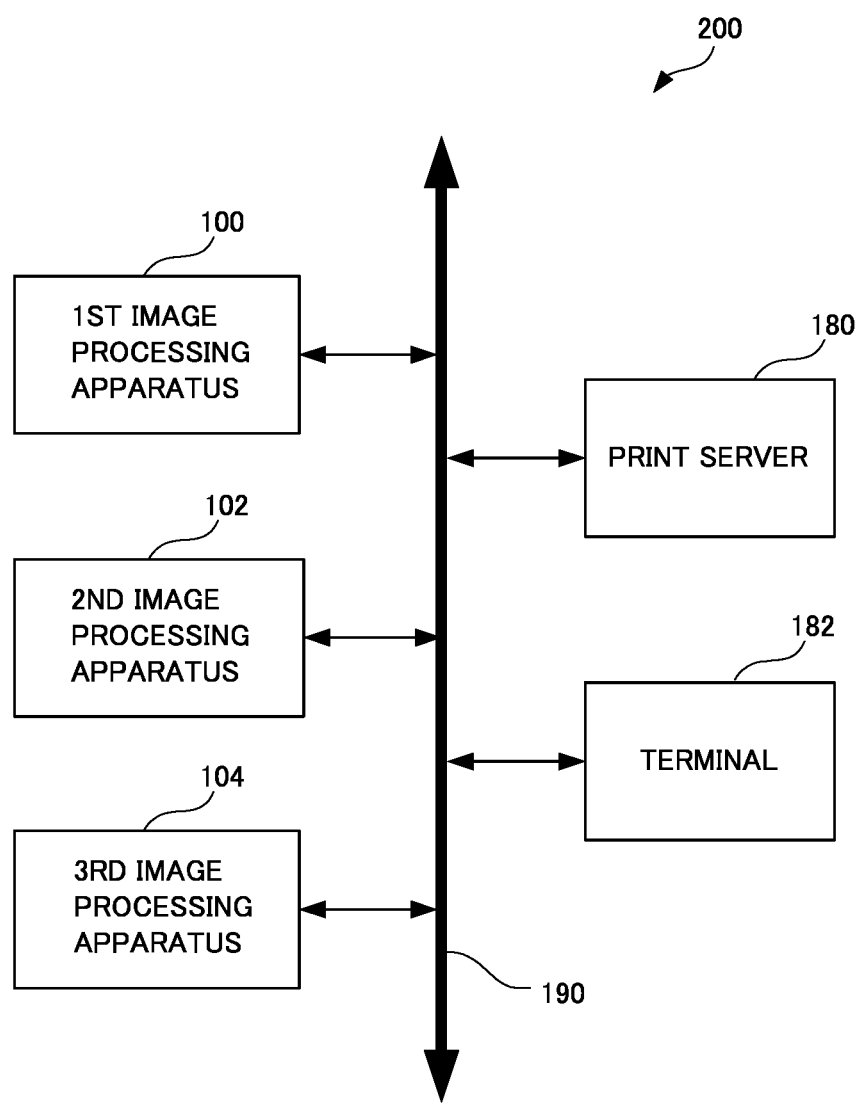
FIG. 1 is a block diagram showing a configuration of an image processing system in accordance with an embodiment of the present invention.

In the following embodiment, the same components are denoted by the same reference characters. Their names and functions are also the same. Therefore, detailed description thereof will not be repeated.

The image processing system in accordance with an embodiment of the present invention includes a plurality of image processing apparatuses and a server computer (in the following, referred to as a print server) connected to each other by a network such as a LAN. The image processing apparatus is a digital MFP having a plurality of functions including printer function, copy function, facsimile function, scanner function and the like. Each image processing apparatus or the print server obtains information related to power supply/demand situation, and changes the state of power consumption in each image processing apparatus in accordance with the power supply/demand situation.

Referring to FIG. 1, an image processing system 200 in accordance with the present embodiment includes first to third image processing apparatus 100, 102 and 104, a print server 180, a terminal 182 and a network 190 to which these are connected. Terminal 182 is, for example, a computer. Print server 180 is a server computer managing the first to third image processing apparatuses 100, 102 and 104. Print server 180 allows the user to operate terminal 182 to form an image (print) by the first to third image processing apparatuses 100 to 104.

In addition to the first to third image processing apparatuses 100 to 104, image processing system 200 may include an image processing apparatus or apparatuses having comparable functions. Three apparatuses are shown as representatives in FIG. 1. Similarly, image processing system 200 may include a plurality of terminals and a plurality of print servers. Only one of each is shown as a representative in FIG. 1. It is assumed that the second and third image processing apparatuses 102 and 104 have the same configuration as first image processing apparatus 100 and hence have the same functions. The following description related to the configuration and functions of first image processing apparatus 100 also applies to the second and third image processing apparatuses 102 and 104.

Figure 2:
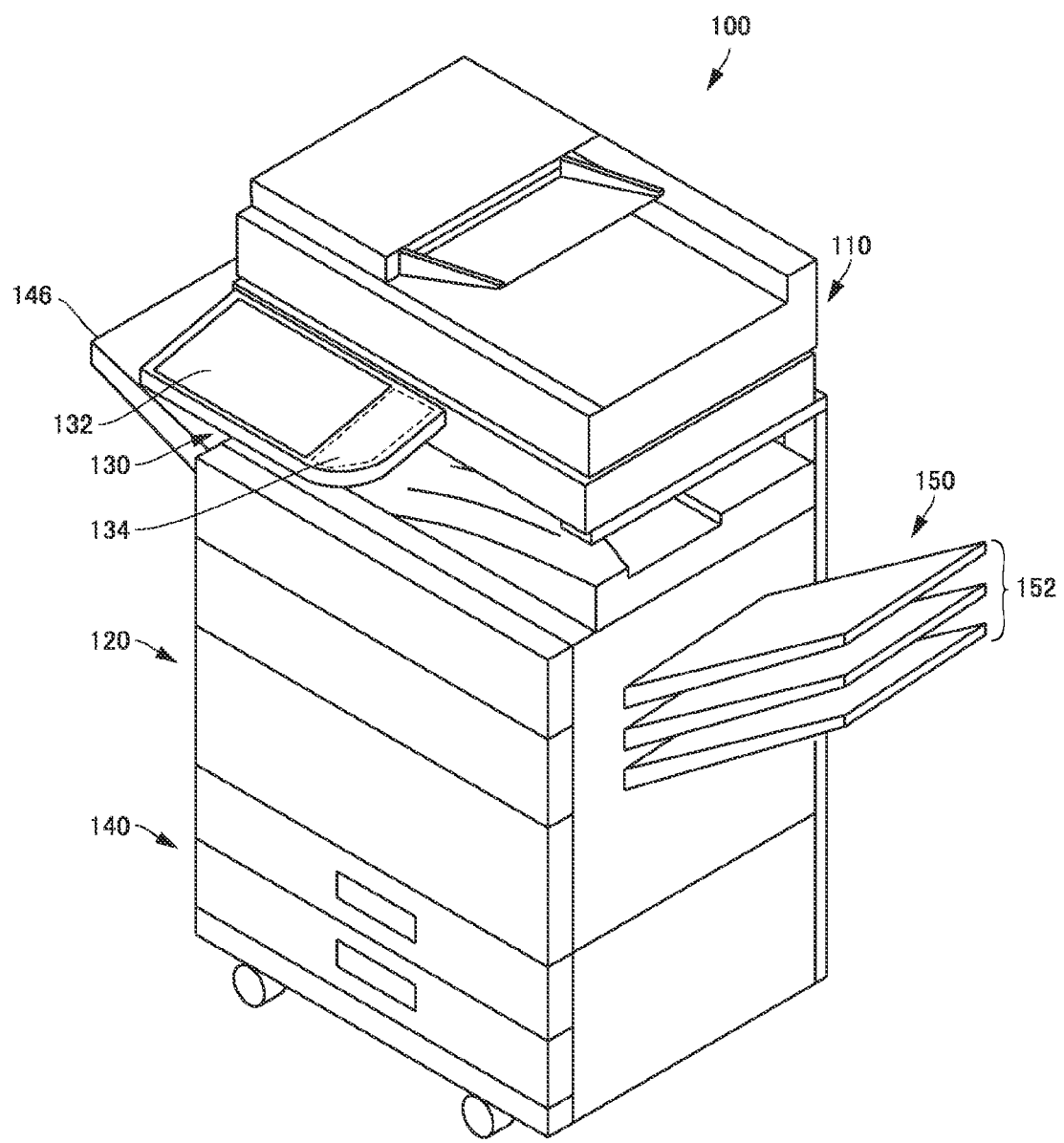
FIG. 2 is a perspective view showing an appearance of the image processing apparatus used in the image processing system in accordance with the present embodiment.

Referring to FIG. 2, image processing apparatus 100 in accordance with the present embodiment includes an image reading unit 110, an image forming unit 120, an operation unit 130, a paper feed unit 140, a manual paper feed tray 146, and a paper discharge unit 150. Operation unit 130 includes a touch-panel display 132 and an operation key unit 134. Touch-panel display 132 includes a display panel implemented by a liquid crystal panel or the like, and a touch-panel arranged on the display panel and detecting a touched position. On operation key unit 134, a number of function keys, not shown, are arranged.

Figure 3:
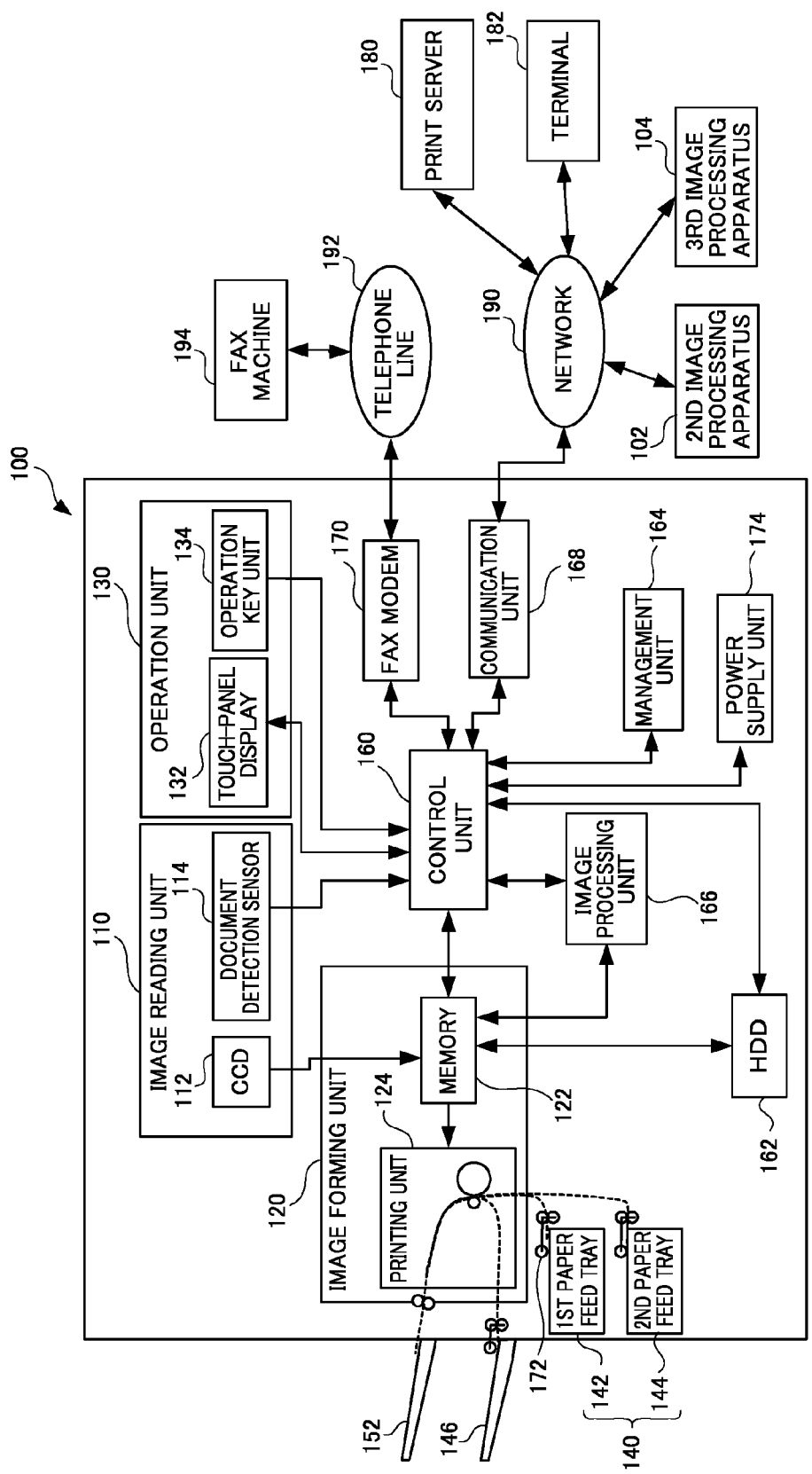
FIG. 3 is a block diagram schematically showing an internal configuration of the image processing apparatus shown in FIG. 2.

Referring to FIG. 3, first image processing apparatus 100 is connected to a telephone line 192, in addition to network 190. In addition to image reading unit 110, image forming unit 120 and operation unit 130, first image processing apparatus 100 includes a control unit 160, a hard disk drive (hereinafter denoted as HDD) 162, a management unit 164, an image processing unit 166, a communication unit 168, a FAX modem 170 and a power supply unit 174.

Image reading unit 110 reads a document and inputs image data. Control unit 160 is, for example, a CPU (Central Processing Unit). Control unit 160 controls various units and components of first image processing apparatus 100 using an ROM (Read Only Memory) (not shown) and an RAM (Random Access Memory) (not shown). ROM is a non-volatile storage device that retains data even when power is turned off. ROM stores programs and data necessary for controlling operations of image processing apparatus 100. RAM is a volatile storage device. Control unit 160 reads a program from ROM to RAM and executes the program using a part of RAM as a work area. Specifically, control unit 160 controls various components and units forming image processing apparatus 100 and realizes each of the functions of image processing apparatus 100 in accordance with a program or programs stored in ROM.

Operation unit 130 receives inputs from the user including instructions to first image processing apparatus 100. Communication unit 168 communicates with terminal 182, second and third image processing apparatuses 102 and 104 and print server 180, through network 190. Image forming unit 120 prints image data on a sheet of recording paper. HDD 162 stores image data. Management unit 164 stores control information, setting information and the like of first image processing apparatus 100.

Control unit 160 controls overall operation of first image processing apparatus 100 based on the information stored in management unit 164. Image processing unit 166 executes various image processing operations on the read image data. FAX modem 170 communicates with a facsimile machine 194 through telephone line 192.

Power supply unit 174 supplies electric power supplied to the first image processing apparatus from the outside to various components and units through a power supply line (not shown), under the control of control unit 160.

In the example shown in FIG. 3, the components and units are connected to control unit 160 and, therefore, data is transmitted between each of the components and units through control unit 160. The configuration, however, is not limiting, and a data bus may be provided and each of the components and units may be connected through the data bus. In that case, each of the components and units are controlled by control unit 160 and data is transmitted between each of the components and units, through the data bus.

Paper feed unit 140 includes first and second paper feed trays 142 and 144. Manual paper feed tray 146 is for manually feeding sheets of recording paper.

First image processing apparatus 100 is capable of transmitting/receiving image data to/from facsimile machine 194 by FAX. If network 190 is further connected to the external Internet, first image processing apparatus 100 is capable of transmitting/receiving image data to/from a terminal such as a PC connected to the Internet by using, for example, electronic mail.

In the following, components and units included in first image processing apparatus 100 shown in FIG. 3 will be described in detail. Image reading unit 110 reads a document and produces image data. Image reading unit 110 includes, for example, a CCD (Charge Coupled Device) 112 as an image reading device, and a document detection sensor 114 for detecting a document set on a platen, an automatic document feeder (ADF) or the like.

Operation unit 130 includes an operation key unit 134 provided with various input keys (hardware keys) and a touch-panel display 132 having a touch-panel arranged on a display panel such as an LCD (Liquid Crystal Display). The user inputs operation instructions or various settings to first image processing apparatus 100 through operation unit 130. An authentication information input device for inputting authentication information of the user who is to use the first image processing apparatus 100 may be provided on operation unit 130. Various methods of inputting user authentication information are available, including direct input of user code, input by reading information on an ID card, or input by reading biometric information (such as fingerprint) of the user. User authentication of first image processing apparatus 100 can be realized by any of these methods. It is possible for the user to instruct interruption, for suspending a recorded job to start another job.

Control unit 160 monitors user operation on touch-panel display 132, input keys and the like provided on operation unit 130, and displays information to be notified to the user, such as the information related to the state of first image processing apparatus 100, on touch-panel display 132.

Image forming unit 120 processes image data and outputs the result. Image forming unit 120 includes a memory 122 and a printing unit 124. Printing unit 124 forms an image on a sheet of recording paper.

Image forming unit 120 temporarily stores image data read by image reading unit 110 in memory 122, and thereafter, stores the image data on memory 122 in HDD 162. Further, image forming unit 120 reads the image data stored in HDD 162 to memory 122. The read data is transferred to printing unit 124, and printed as an image on a sheet of recording paper and output.

HDD 162 stores the input image data. HDD 162 is a magnetic recording medium and it is capable of storing and successively processing a large amount of image data. Thus, first image processing apparatus 100 can process instructions from a plurality of users efficiently.

Image processing unit 166 is controlled by control unit 160 that receives a user instruction from operation unit 130. Image processing unit 166 reads image data from memory 122, executes the instructed image processing, and stores the result in memory 122. The image data as the result of processing is displayed on touch-panel display 132 through control unit 160. Thereafter, the image data in memory 122 is, in response to a user instruction, transferred to printing unit 124 and printed on a sheet of recording paper, output to telephone line 192 through FAX modem 170, or output to network 190 through communication unit 168.

Figure 4:
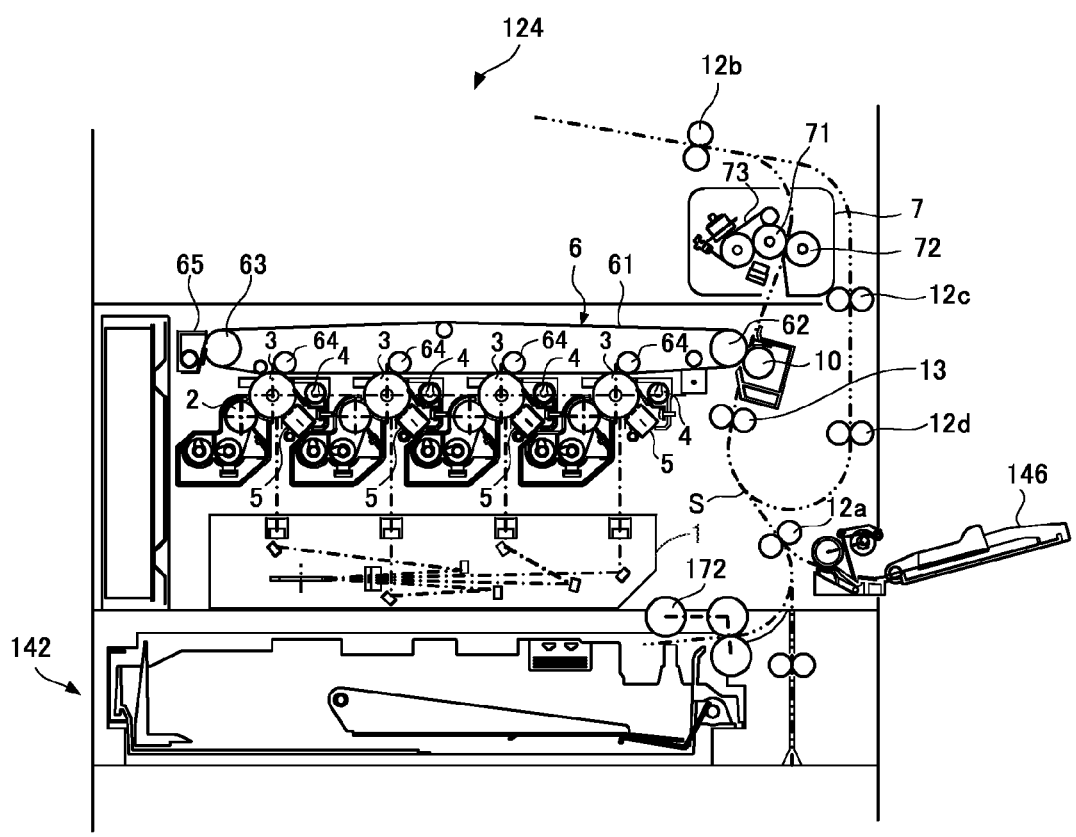
FIG. 4 is a cross-sectional view showing a configuration of a printing unit shown in FIG. 3.

Image formation on a sheet of recording paper will be described in greater detail. Referring to FIG. 4, printing unit 124 includes an optical scanning device 1, a developer 2, a photoreceptor drum 3, a cleaner unit 4, a charger 5, an intermediate transfer belt unit 6, and a fixing unit 7. The image data handled in first image processing apparatus 100 are color image data using colors of black (K), cyan (C), magenta (M) and yellow (Y), that is, image data separated to components of these four colors. Therefore, in order to form four different latent images of respective colors, four developers 2, four photoreceptor drums 3, four chargers 5 and four cleaner units 4 are provided. These components form four image stations for processing black, cyan, magenta and yellow, respectively.

Charger 5 is a device for uniformly charging the surface of photoreceptor drum 3 to a prescribed potential. Other than the charger type device shown in FIG. 4, a contact roller type, or a brush type charger may be used as charger 5.

Optical scanning device 1 is a laser scanning unit (LSU) including a laser emitting unit and a reflection mirror. In optical scanning device 1, a polygon mirror for laser beam scanning and an optical element including a lens and a mirror for guiding the laser beam reflected by the polygon mirror to photoreceptor drum 3 are arranged. Other than such a configuration, a configuration having an EL or LED write head having light emitting elements arranged in an array, may be used as optical scanning device 1.

Optical scanning device 1 exposes the charged photoreceptor drum 3 in accordance with the input image data, and thereby forms an electrostatic latent image in accordance with the image data on the surface. Developer 2 turns the electrostatic latent images formed on respective photoreceptor drums 3 to visible images with toners of four colors (YMCK), respectively. Cleaner unit 4 removes and recovers the toner left on the surface of each photoreceptor drum 3, after development and image transfer.

Intermediate transfer belt unit 6 arranged above photoreceptor drum 3 includes an intermediate transfer belt 61, an intermediate transfer belt driving roller 62, an intermediate transfer belt driven roller 63, an intermediate transfer roller 64 and an intermediate transfer belt cleaning unit 65. There are four intermediate transfer rollers 64, corresponding to respective colors of Y, M, C and K.

Around intermediate transfer belt driving roller 62, intermediate transfer belt driven roller 63, and intermediate transfer roller 64, intermediate transfer belt 61 is wound and driven to rotate. Each intermediate transfer roller 64 supplies transfer bias, which will be described later, for transferring the toner image on the corresponding photoreceptor drum 3 to intermediate transfer belt 61.

Intermediate transfer belt 61 is provided to be in contact with each photoreceptor drum 3. By successively transferring the toner images of respective colors formed on photoreceptor drums 3 onto intermediate transfer belt 61 to be superposed on the last, a color toner image (multi-color toner image) is formed on intermediate transfer belt 61. Intermediate transfer belt 61 is formed as an endless belt, using a film having the thickness of about 100 μm to 150 μm.

Transfer of the toner image from photoreceptor drum 3 to intermediate transfer belt 61 is done by intermediate transfer roller 64 that is in contact with the back side of intermediate transfer belt 61. A high voltage transfer bias (high voltage of a polarity (+) opposite to the charged polarity (−) of the toner) is applied to intermediate transfer roller 64, in order to transfer the toner image. Intermediate transfer roller 64 has a metal shaft (for example, of stainless steel) of 8 to 10 mm in diameter as a base, with its surface covered by a conductive elastic member (such as EPDM or urethane foam). Because of this conductive elastic member, uniform high voltage can be applied to intermediate transfer belt 61. Though a roller-shaped transfer electrode is used in the present embodiment, a brush or the like may be used as an alternative.

The electrostatic images turned to visual images in accordance with the hue on respective photoreceptor drums 3 as described above are superposed on intermediate transfer belt 61. Information of the thus superposed images (density distribution of toner) is transferred to a sheet of recording paper, as intermediate transfer belt 61 is rotated, by a transfer roller 10 arranged at the position of contact between the intermediate transfer belt 61 and the sheet of recording paper.

At this time, intermediate transfer belt 61 and transfer roller 10 are brought into pressure-contact with a prescribed nip, and a voltage (high voltage of a polarity (+) opposite to the charged polarity (−) of the toner) for transferring the toner to the sheet of recording paper is applied to transfer roller 10. Further, in order to constantly secure the nip mentioned above, a hard material (metal or the like) is used for one of the transfer roller 10 and intermediate transfer belt driving roller 62, and a soft material such as soft roller (elastic rubber roller, foam resin roller or the like) is used for the other one.

Further, as described above, the toner adhering to intermediate transfer belt 61 by the contact with photoreceptor drum 3, or toner not transferred to the sheet of recording paper by transfer roller 10 but left on intermediate transfer belt 61 may cause undesirable mixture of toner colors in subsequent process steps. Therefore, the toner left on intermediate transfer belt 61 is removed and recovered by intermediate transfer belt cleaning unit 65. In intermediate transfer belt cleaning unit 65, a cleaning blade that is brought into contact with intermediate transfer belt 61 is provided as a cleaning member. Intermediate transfer belt 61 is supported by intermediate transfer belt driven roller 63 at a portion where the cleaning blade contacts.

FIG. 4 shows a paper feeding path S formed in a substantially vertical direction, for feeding sheets of recording paper in first paper feed tray 142 and manual paper feed tray 146 to paper discharge tray 152 through transfer roller 10 and fixing unit 7. In the vicinity of paper feeding path S, a pick-up roller 172, a plurality of conveyor roller pairs 12a to 12e, a registration roller pair 13, a transfer roller 10, fixing unit 7 and the like are arranged.

Conveyor roller pairs 12a to 12d are small rollers for promoting and assisting feeding of the recording paper, and a plurality of conveyor roller pairs are provided along paper feeding path S. Pick-up roller 172 is arranged near an end of first paper feed tray 142, picks up sheets of recording paper one by one from first paper feed tray 142 and supplies the sheets to paper feeding path S.

Registration roller pair 13 temporarily holds the sheet of recording paper fed along paper feeding path S. Then registration roller pair 13 feeds the sheet of recording paper to transfer roller 10 at such timing when the leading edge of toner image on intermediate transfer belt 61 is aligned with the leading edge of the sheet of recording paper.

Fixing unit 7 includes a heat roller 71 and a pressure roller 72. Heat roller 71 and pressure roller 72 rotate, with the sheet of recording paper pinched therebetween. Heat roller 71 is heated from outside, by an external heating belt 73. Here, heat roller 71 is set to a prescribed fixing temperature by control unit 160, based on a signal from a temperature detector (not shown). Heat roller 71 presses with heat, together with pressure roller 72, the toner to the sheet of recording paper, and thus melts, mixes and causes pressure-contact of multi-color toner image that has been transferred to the sheet of recording paper and thereby heat-fixing the image on the sheet of recording paper.

Various modes for executing functions available in the first image processing apparatus 100 (copy function, printer function, scanner function and facsimile function) will be briefly described.

(Copy Mode)

When image processing apparatus 100 is used as a copy machine, image data of the document read by image reading unit 110 is output as a copy from image forming unit 120.

By the CCD 112 provided at image reading unit 110, images of the document set at a reading position can be electronically read. The read image data is completed as output data (print data) on memory 122, and stored in HDD 162. If there is a plurality of documents, the reading and storage operations are repeated. Thereafter, based on the process mode instructed from operation unit 130, the image data stored in HDD 162 is successively read at appropriate timing and transmitted to memory 122. Then, the image data is transmitted from memory 122 to printing unit 124 timed with image formation at printing unit 124.

When the read image is to be printed on a plurality of pages, the image data is stored page by page as output data in the similar manner in HDD 162, transmitted from HDD 162 to memory 122 and transmitted to printing unit 124 timed with image formation, repeatedly for the number of pages to be output.

Specifically, as described above, optical scanning device 1 exposes charged photoreceptor drum 3 in accordance with the input image data, whereby an electrostatic latent image in accordance with the image data is formed on the surface of photoreceptor drum 3. The electrostatic latent image on photoreceptor drum 3 is transferred to intermediate transfer belt 61. The electrostatic latent image is turned to visible image on intermediate transfer belt 61, and transferred to a fed sheet of recording paper by means of registration roller pair 13. Thereafter, the recording paper is heated and pressed by fixing unit 7, and discharged to paper discharge tray 152.

(Printer Mode)

When image processing apparatus 100 is used as a printer, image data received through communication unit 168 is output from image forming unit 120 through memory 122 and the like.

Communication unit 168 is connected to network 190 in wired or wireless manner, and receives image data from terminal 182 as an external device connected to network 190. The received image data is transmitted page by page as output image data to memory 122, and stored in HDD 162. Then, the image data is again transmitted from HDD 162 to memory 122 and transmitted to printing unit 124 as in the copy mode described above, and image formation takes place.

(Scanner Mode)

When image processing apparatus 100 is used, for example, as a network scanner, image data of the document read at image reading unit 110 is transmitted from communication unit 168 through network 190 to an arbitrary terminal (for example, terminal 182). Here again, the document is electronically read by CCD 112 provided at image reading unit 110. The read image data is completed as output data on memory 122, and stored in HDD 162. Thereafter, the image data is again transmitted from HDD 162 to memory 122, and after communication with a transmission destination designated through operation unit 130 is established, transmitted from communication unit 168 to the designated transmission destination.

(Facsimile Mode)

The first image processing apparatus 100 has FAX modem 170 connected to telephone line 192 and communication unit 168 connected to the Internet, as described above. Therefore, first image processing apparatus 100 is capable of FAX transmission/reception to/from facsimile machine 194 through telephone line 192.

When first image processing apparatus 100 is used as a facsimile machine, data received by FAX from facsimile machine 194 is formed as image data on memory 122, and in the similar manner as described above, storage in HDD 162 and printing by printing unit 124 can be executed. Further, first image processing apparatus 100 can read image data from HDD 162, convert the data to a data format for FAX communication and transmit the converted data to facsimile machine 194.

Print server 180 includes, similar to a general purpose computer, a CPU, an RAM, an ROM, an HDD and an NIC.

Figure 5:
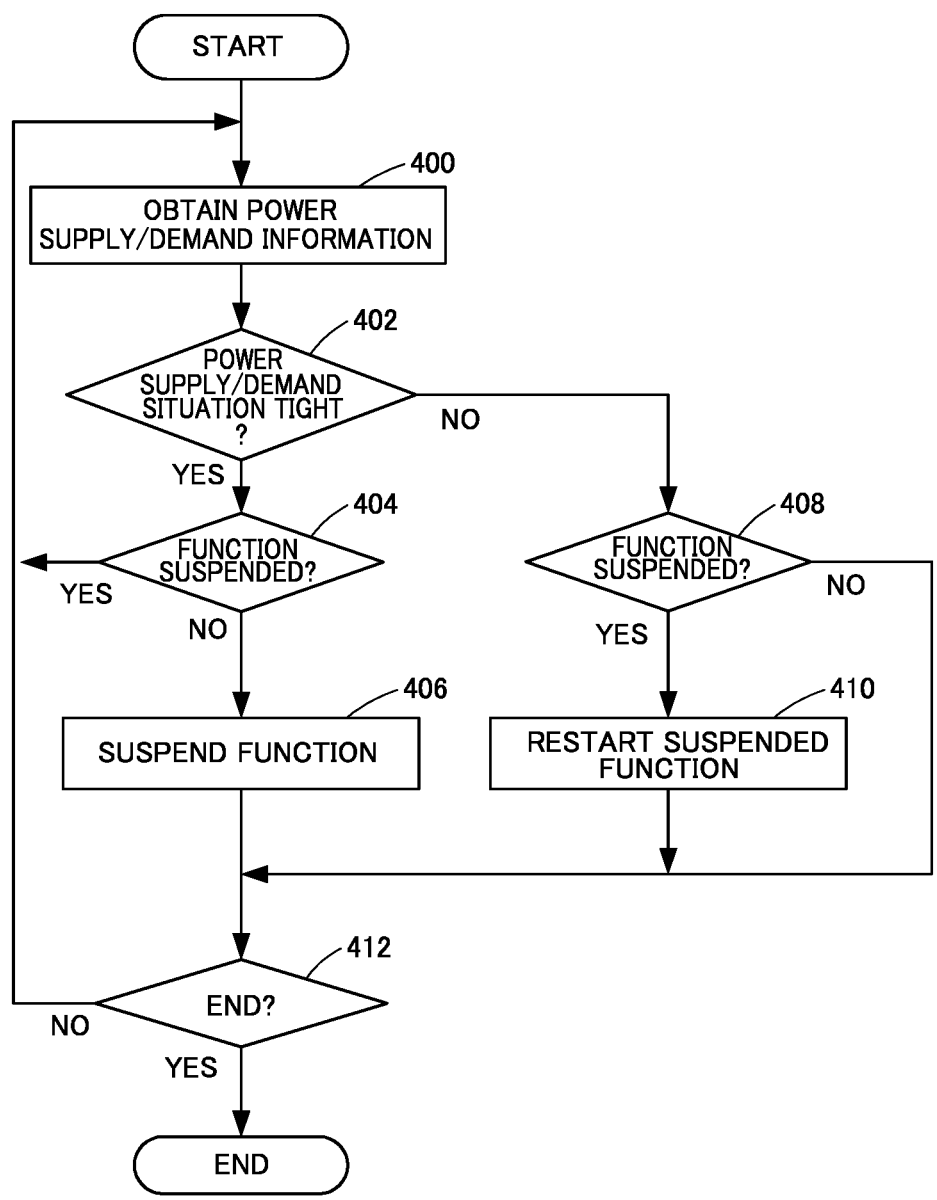
FIG. 5 is a flowchart representing a control structure of a program executed by each image processing apparatus forming the image processing system in accordance with an embodiment of the present invention.

In the following, the function of changing state of power consumption in each of the first to third image processing apparatuses 100 to 104 in accordance with the power supply/demand situation in image processing system 200 will be specifically described. Referring to FIG. 5, a control structure of a program executed by control unit 160 of first image processing apparatus 100 will be described. The same program is executed also in the second and third image processing apparatuses 102 and 104.

At step 400, control unit 160 obtains the power supply/demand information from the outside, through network 190. The power supply/demand information is known information related to the power supply provided, for example, by a power company and the like.

As to the method of obtaining the power supply/demand information, it may be obtained by accessing to a home page (Web page) of the power company, obtained by receiving electronic mail distributed from the power company, or obtained by using a dedicated application. Available power supply/demand information may include on-peak power availability (MW (mega watts)), on-peak time zone, expected maximum power demand (MW) and its time zone, as well as usage rate (%) (usage rate=expected maximum power demand/on-peak power availability). Actual values (MW) of one day and the previous day may be provided at a prescribed time interval (for example, hourly), or momentary values (MW) may be provided in shorter period (for example, at an interval of 3 minutes). In order to obtain the power supply/demand information to be used for controlling first image processing apparatus 100, it is necessary to obtain the information provided by the power company which supplies electric power to the facility where the first image processing apparatus 100 is installed.

FIG. 6 shows an example of data downloaded from a home page of a power company. The data shown in FIG. 6 is of XX (day), XX (month), 2011. FIG. 6 shows data provided as a CSV (comma separated value) file, displayed using a spread-sheet application. The data includes information of expected maximum power demand of 23600 MW, its time zone of 14:00 to 15:00, on-peak power availability of 26000 MW, its time zone of 13:00 to 17:00, and usage rate of 91%. FIG. 6 also includes the actual hourly values of the day and the previous day. The power supply/demand information of the next day is provided, for example, in such a format as shown in FIG. 7. Actual values of short period of one day may be provided, for example, in a format shown in FIG. 8. The data shown in FIGS. 6 to 8 may be provided as one file or separate files.

The obtaining method using a dedicated application includes, for example, use of an API (Application Program Interface), offered by Internet service providers. By way of example, if an API provided by Yahoo! is to be used, an URI (Uniform Resource Identifier) with a parameter added to designate the type of requested data may be input to a browser. Thus, the requested data is returned in a prescribed file format from the corresponding web server and displayed by the browser (for example, see, http://developer.yahoo.co.jp/webapi/shinsai/setsuden/v1/latestpowerusage.html). For instance, information related to area (Area), power consumption (Usage), maximum power supply (Capacity), date of collection (Date), hour of collection (Hour) and minute of collection (Min) can be obtained in XML file format. The power supply/demand information may be obtained by any other method.

At step 402, control unit 160 determines whether or not the power supply/demand situation is tight, from the power supply/demand information obtained at step 400. That the "power supply/demand situation is tight" means a situation where electric power is not stably supplied, and it may include not only when the power is supplied with scarce margin of power supply with respect to the demand, but also when such a state of scarce margin of power supply is expected within a prescribed time period. If it is determined that the power supply/demand situation is tight, the control proceeds to step 404. Otherwise, the control proceeds to step 408. Specifically, control unit 160 reads prescribed data from the power supply/demand information and compares it with a prescribed threshold value, or compares a value calculated based on the obtained power supply/demand information with a prescribed threshold value. For the determination, the usage rate, for example, may be used. If the prescribed value is, for example, 90%, and the usage rate in the power supply/demand information obtained at step 400 is equal to or higher than 90%, the control proceeds to step 404, and if it is lower than 90%, the control proceeds to step 408. If the information obtained at step 400 includes the values of expected maximum power demand and on-peak power availability but not the value of usage rate, the usage rate may be calculated by dividing the value of expected maximum power demand by the value of on-peak power availability, and the result may be compared with the threshold value.

Typically, terms used in a file of power supply/demand information provided by a power company are fixed. Therefore, a specific data can be searched out using the corresponding term, from the obtained power supply/demand information. By way of example, in FIG. 6, if "usage rate" is to be obtained, what is necessary is to read the file by spread-sheet software, conducting text-search using "usage rate" as a keyword, and to get the value in the cell immediately below the searched out cell. Then the value 91(%) of usage rate is obtained. The on-peak power availability, the time zone of on-peak power availability, the expected maximum power demand and the time zone of expected maximum power demand can also be obtained in the similar manner.

At step 404, control unit 160 determines whether or not any function of first image processing apparatus is suspended. The function or functions of first image processing apparatus 100 are suspended at step 406, which will be described later. If it is determined that no function is suspended, the control proceeds to step 406. If it is determined that a function or functions are suspended, the control returns to step 400.

At step 406, control unit 160 suspends some of or all of the functions of first image processing apparatus 100. Specifically, control unit 160 controls power supply unit 174 such that power supply to an internal unit or units that consume much power is stopped. By way of example, power supply to fixing unit 7, or more specifically power supply to the heater for heating heat roller 71 is stopped. As a result, it becomes impossible for first image processing apparatus 100 to perform image formation on a sheet of recording paper. Thus, some of the functions of first image processing apparatus 100 (printer function and copy function) are suspended. Thus, power consumption can be reduced. It is also possible to stop power supply to all internal units. Specifically, power supply to all internal units may be stopped, except for those units necessary to resume the normal state by obtaining external information, such as control unit 160, HDD 162, management unit 164 and communication unit 168.

At step 408, control unit 160 determines whether or not any function of first image processing apparatus is suspended. If it is determined that a function or functions are suspended, the control proceeds to step 410. Otherwise, the control proceeds to step 412.

At step 410, control unit 160 restarts the function or functions that have been suspended. Specifically, control unit 160 controls power supply unit 174 such that power supply to the suspended internal unit or units is resumed.

At step 412, control unit 160 determines whether or not an end instruction has been received. The end instruction is, for example, turning OFF of the power of first image processing apparatus 100. If it is determined that an end instruction is received, the present program ends. Otherwise, the control returns to step 400.

In this manner, if it becomes clear that the power supply/demand situation is tight, each of the first to third image processing apparatuses 100 to 104 forming image processing system 200 suspends part of or all of its functions, to reduce power consumption. For instance, by stopping power supply to fixing unit 7 as described above, power consumption can be reduced. Here, power is continuously supplied to internal units related to functions of relatively small power consumption such as scanner function and facsimile function, and these functions can be used. Therefore, while the power consumption can be reduced depending on the power supply/ demand situation, full shut-down of image processing apparatuses 100 to 104 can be avoided and, therefore, disadvantages in operating image processing apparatuses 100 to 104 and image processing system 200 can be minimized.

Further, by repeating steps 400 to 412 described above, it is possible to recover the suspended functions in each of image processing apparatuses 100 to 104 when the power supply/demand situation improves.

Though an example in which the power supply/demand situation is determined by comparing the usage rate with a prescribed threshold value has been described, it is not limiting. Information related to the time when power supply/demand situation becomes tight may be used. For example, even if the usage rate is equal to or higher than the prescribed threshold value (90%), the power supply/demand situation may be determined not tight, if the current time is out of the time zone (14:00 to 15:00 in FIG. 6) of expected maximum power demand. Further, even if the usage rate is equal to or higher than the prescribed threshold value, the power supply/demand situation may be determined not tight, if the current time is by more than a prescribed time period before the start of time zone (14:00 in FIG. 6) of expected maximum power demand. The prescribed time period here may be set appropriately, considering the timing of obtaining the power supply/demand information.

The power supply/demand situation may be determined using a value other than the usage rate. By way of example, the determining process similar to the above may be executed using only the information of time zone of expected maximum power demand, not using the usage rate. For instance, at step 402, control unit 160 may determine whether or not the current time is within the time zone of expected maximum power demand.

Though an example in which a specific function (specifically, an internal unit) or all functions are suspended using one threshold value has been described above, it is not limiting. By way of example, power supply to a plurality of internal units may be successively suspended depending on results of determination, using a plurality of threshold values. For example, 90%, 95% and 97% may be used as threshold values, and assuming that first to third internal units have larger power consumption in this order, power supply to the first unit may be stopped if 90(%)≤usage rate<95(%), power supply to the first and second units may be stopped if 95(%)≤usage rate<97(%), and power supply to the first to third internal units may be stopped if 97(%)≤usage rate.

Though each of the image processing apparatuses 100 to 104 obtains the power supply/demand information to determine whether or not the power supply/demand situation is tight in the foregoing, it is not limiting. Print server 180 may obtain the power supply/demand information to determine whether or not the power supply/demand situation is tight. If the power supply/demand situation is determined to be tight, a prescribed signal is transmitted from print server 180 to each of the image processing apparatuses 100 to 104, and in accordance with the signal, each of the image processing apparatuses 100 to 104 stops part of or all of its functions. If the prescribed signal is transmitted to all of the image processing apparatuses 100 to 104, it follows that all image processing apparatuses 100 to 104 suspend their functions and the user cannot use any of the apparatuses. Thus, it is preferred that the prescribed signal is sent to only a specific image processing apparatus or apparatuses.

The power supply/demand information may be periodically obtained by each of the image processing apparatuses 100 to 104 or by print server 180, or it may be transmitted from the outside to each of the image processing apparatuses 100 to 104 or to print server 180 when the power supply/demand situation changes.

Figure 9:
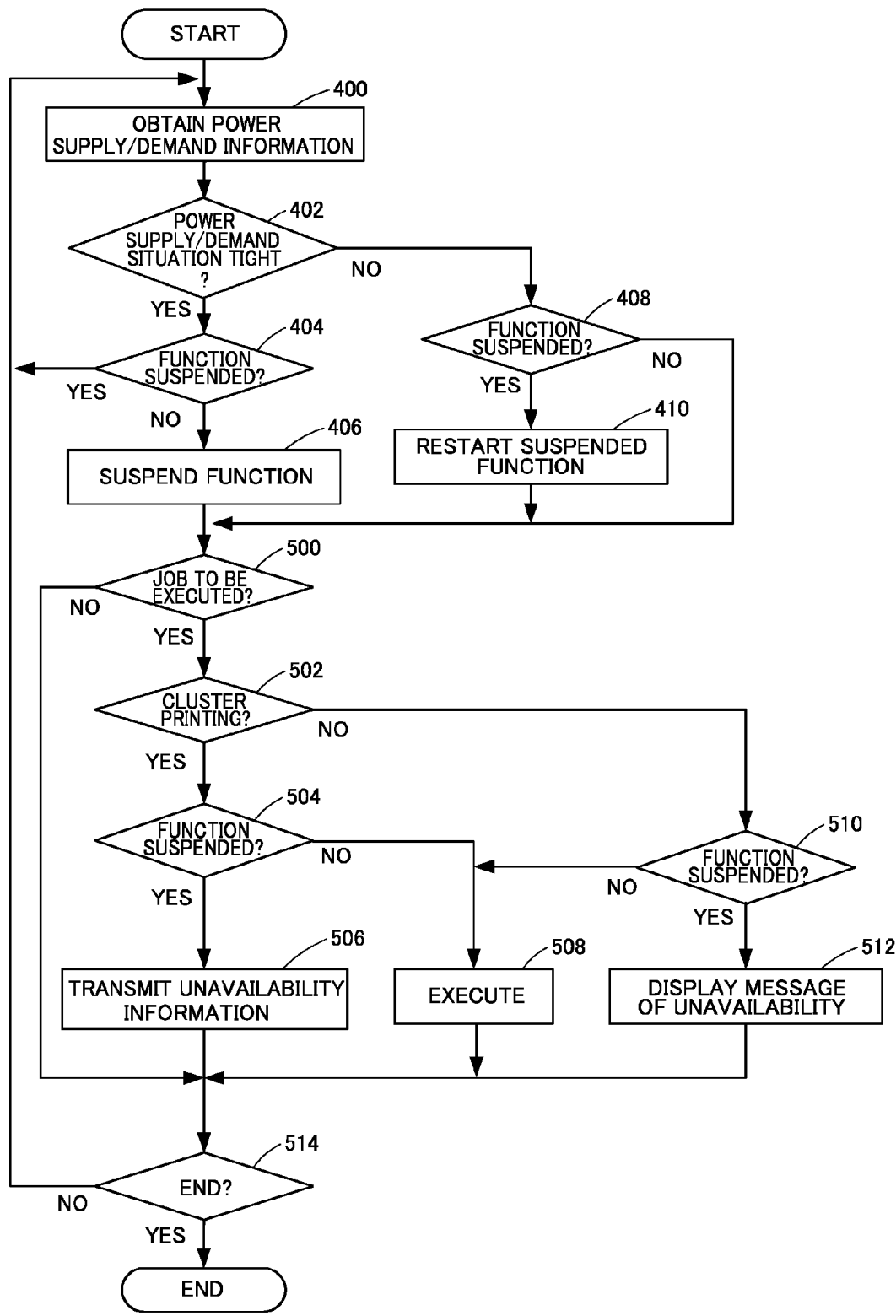
FIG. 9 is a flowchart representing a control structure of a program considering handling of a cluster printing job executed in the image processing system in accordance with an embodiment of the present invention.

Next, a control structure of a program considering handling of cluster printing job will be described. Referring to FIG. 9, the control structure of a program executed by control unit 160 of first image processing apparatus 100 will be described. Here, it is assumed that if the power supply/demand information is determined to be tight, a function or functions of the first image processing apparatus are suspended, while functions of the second and third image processing apparatuses are not suspended. Further, if print server 180 causes the plurality of image processing apparatuses 100 to 104 to execute cluster printing, a job transmitted to at least the first image processing apparatus 100 includes a piece of information notifying cluster printing.

Steps 400 to 410 are the same as those of the flowchart shown in FIG. 5. At step 500, control unit 160 determines whether or not execution of a job is instructed. Execution of a job is instructed, for example, by an operation of operation unit 130 by the user. Execution of a job may also be instructed when a job (print job or the like) is received from print server 180 or terminal 182 through network 190. If terminal 182 is to execute cluster printing using image processing apparatuses 100 to 104, terminal 182 transmits the job to print server 180, and print server 180 generates jobs to be allocated to each of the image processing apparatuses 100 to 104 from the received job and transmits the generated jobs to each of the image processing apparatuses 100 to 104. If it is determined that execution of the job is instructed, the control proceeds to step 502. Otherwise, the control proceeds to step 514.

At step 502, control unit 160 determines whether or not the instructed job is a cluster printing job. Specifically, control unit 160 determines whether or not a job having the piece of information notifying a cluster printing job added has been received from print server 180. If it is determined that a cluster printing job is received, the control proceeds to step 504. Otherwise, the control proceeds to step 510.

At step 504, control unit 160 determines whether or not any function of first image processing apparatus 100 (that is, power supply to fixing unit 7) is suspended. If it is determined that the function is suspended, the control proceeds to step 506. Otherwise, the control proceeds to step 508.

If the function of first image processing apparatus 100 is suspended, control unit 160 cannot execute the allocated job. Therefore, at step 506, control unit 160 transmits a piece of information notifying that execution of cluster printing job is impossible to print server 180. In response, print server 180 transmits the job that has been allocated to first image processing apparatus 100 to another image processing apparatus (here, to the second image processing apparatus 102 and/or third image processing apparatus 104), to be executed there.

If no function is suspended in first image processing apparatus 100, at step 508, control unit 160 executes the instructed job (allocated job).

If the instructed job is not a cluster printing job, at step 510, control unit 160 determines whether or not any function of first image processing apparatus 100 is suspended. If it is determined that the function is suspended, the control proceeds to step 512. Otherwise, the control proceeds to step 508, and control unit 160 executes the instructed job.

At step 512, control unit 160 presents a message that execution of the instructed job is impossible. For example, if execution of a job is instructed by a user operating operation unit 130, a message such as "Print Impossible Now" is displayed on touch-panel display 132. If a print job is received from terminal 182, the message that execution of the instructed job is impossible is transmitted to terminal 182 that has transmitted the job. Receiving the message, terminal 182 displays the received message on a display device provided on terminal 182.

At step 514, control unit 160 determines whether or not an end instruction is received. If it is determined that the end instruction is received, the present program ends. Otherwise, the control returns to step 400.

In this manner, if the power supply/demand situation is determined to be tight, a cluster printing job can executed with the maximum number of image processing apparatuses operated to execute the cluster printing job reduced (from three to two in the example above), and hence, power consumption can be reduced. If the power supply/demand situation improves, the suspended function of first image processing apparatus 100 is resumed and, therefore, the cluster printing job can be executed using all image processing apparatuses 100 to 104.

Though a system in which cluster printing is execute using three image processing apparatuses 100 to 104 in a normal mode has been described, it is not limiting. A system executing cluster printing using four or more image processing apparatuses is also possible.

Though an example has been described in which one image processing apparatus (image processing apparatus 100) has its function suspended when the power supply/demand condition is determined to be tight has been described, it is not limiting. Functions of a plurality of image processing apparatuses may be suspended.

It is also possible to cause the plurality of image processing apparatuses to suspend their functions successively, depending on the degree of tightness of power supply/demand situation. By way of example, in a system executing a cluster printing job using three image processing apparatuses, assume that power consumption of the first image processing apparatus is the highest and becomes smaller in the order of first, second and third image processing apparatus 100, 102 and 104, and that the first to third image processing apparatuses 100 to 104 are each capable of suspending a function or functions (for example, capable of stopping power supply to the fixing unit) depending on the tightness of power supply/demand situation. In such a system, what is necessary is to set different threshold values for the first to third image processing apparatuses, respectively. By way of example, assume that the threshold values for the first to third image processing apparatuses are 90%, 95% and 97%, respectively. Then, it is possible to suspend the fixing unit in the first image processing apparatus 100 if 90(%)≤usage rate<95(%), to stop the fixing units in the first and second image processing apparatuses if 95(%)≤usage rate<97(%), and to stop the fixing units of the first, second and third image processing apparatuses 100, 102 and 104 if 97(%)≤usage rate. By such an approach, the image processing apparatus of which function is suspended can automatically be determined depending on the power supply/demand situation, and it is possible to appropriately cope with tightening of power supply/demand situation.

The process for suspending a function is not limited to stopping of power supply to the fixing unit. Power supply to an internal unit other than the fixing unit may be stopped.

Though an example in which a piece of information notifying that the cluster printing job cannot be executed is transmitted from control unit 160 of first image processing apparatus 100 to print server 180 has been described, it is not limiting. For example, control unit 160 of first image processing apparatus 100 may transfer the job (allocated job of cluster printing job) received from print server 180 to another image processing apparatus (for example, the second or third image processing apparatus 102 or 104) to be executed there.

The job executed by using a plurality of image processing apparatuses (hereinafter also referred to as a distributed job) is not limited to a print job (cluster printing job). It may be FAX transmission or copying. For instance, assume that in image processing system 200, print job and FAX transmission job are jobs executable by using first to third image processing apparatuses 100 to 104, and that power supply only to the fixing unit of first image processing apparatus 100 is stopped. Even in this situation, the first image processing apparatus 100 can execute FAX transmission. Therefore, in place of steps 502 and 504, whether or not the job is a distributed job may be determined, and if it is a distributed job, whether or not the suspended function is indispensable to execute the distributed job may be determined. Then, which of steps 506 and 508 is to be executed can be determined based on the result of determination. If the distributed job is a cluster printing job, for example, the operation is the same as described above. If it is a FAX transmission job, even if power supply to the fixing unit of first image processing apparatus 100 is stopped, first image processing apparatus 100 can execute FAX transmission and, therefore, step 508 is executed.

Though an example in which a piece of information notifying the cluster printing is added to the cluster printing job has been described above, it is not limiting. For example, print server 180 may transmit, before or after transmitting a cluster printing job, a piece of information notifying that the to-be transmitted or transmitted job is a cluster printing job, to the corresponding image processing apparatus, separate from the cluster print job.

When print server 180 instructs execution of cluster printing, before transmitting jobs allocated to respective image processing apparatuses, it may inquire the image processing apparatus, of which function is to be suspended if power supply/demand situation is determined to be tight, as to whether the function has been suspended, through network 190. As a result, if one or more of the image processing apparatuses have their functions suspended, print server 180 may determine image processing apparatuses to be used for executing the distributed job, excluding the function-suspended image processing apparatus or apparatuses, and allocate and transmit the jobs to the thus determined image processing apparatuses. If such an approach is taken, the piece of information notifying the cluster printing may not be added when the cluster printing job is transmitted from print server 180 to each image processing apparatus.

If print server 180 obtains the power supply/demand information and determines the power supply/demand situation, and if the power supply/demand situation is determined to be tightening after transmitting a cluster printing job, print server 180 may transmit an instruction to cancel execution of the cluster printing job to one or more of, or all of the plurality of image processing apparatuses to which the cluster printing job has been transmitted. Here, "to cancel" means to discard the job, or to withhold execution without discarding. In this case also, the piece of information notifying the cluster printing may not be added to the cluster printing job. If such an approach is taken, each image processing apparatus may not have the function of stopping power supply to the internal unit depending on the power supply/demand situation. Print server 180 may transmit the cluster printing job that has been allocated to the image processing apparatus to which the cancel instruction is sent, to another image processing apparatus to which the cancel instruction is not sent. If the power supply/demand situation improves, print server 180 may again cause the image processing apparatus to which the cancel instruction has been sent to execute the job.

The image processing apparatus or apparatuses of which function is to be suspended if the power supply/demand situation is determined to be tight may be determined in advance or in adaptive manner, under prescribed conditions in consideration of specification of each image processing apparatus. By way of example, the image processing apparatus or apparatuses of which function is to be suspended may be determined such that the total power consumption by the image processing apparatuses executing the distributed job does not exceed a prescribed amount of power. If the power supply/demand information includes the maximum available power supply, the image processing apparatus or apparatuses of which function is to be suspended may be determined not to exceed the maximum available power supply. Alternatively, the image processing apparatus or apparatuses of which function is to be suspended may be determined such that the total power consumption by the image processing apparatuses is minimized under the condition that use efficiency for the users is not affected. By way of example, the function may be suspended starting from an image processing apparatus of which power consumption per page is the highest.

The image processing apparatus or apparatuses of which function is to be suspended may be determined using a known TEC value. The TEC (Typical Electricity Consumption) value represents typical electricity consumption per week (Wh) determined by The Energy Conservation Center Japan. Based on a typical manner of office use assuming five work days in which operation, sleep and off are repeated and two holidays of sleep or off, for various office appliances such as printers, the TEC value is calculated based on the specification and power consumption of each apparatus.

If the power supply/demand situation is determined to be tight, it is possible that every image processing apparatus forming the image processing system transmits the information that execution of a distributed job is impossible to print server 180 and the job is not executed. In such a situation, functions may be suspended in all image processing apparatuses and hence execution of the distributed job becomes impossible. Then, print server 180 may temporarily withhold the job and monitor the power supply/demand situation for a prescribed time period. If the power supply/demand situation improves and suspended functions of at least some of the image processing apparatuses are resumed to enable execution of the distributed job, the withheld job may be executed. If it is possible to determine the image processing apparatuses to be used for executing the distributed job such that the prescribed amount of power is not exceeded as described above, the withheld job may be executed if the total power consumption of image processing apparatuses is minimized under prescribed conditions.

Figure 10:
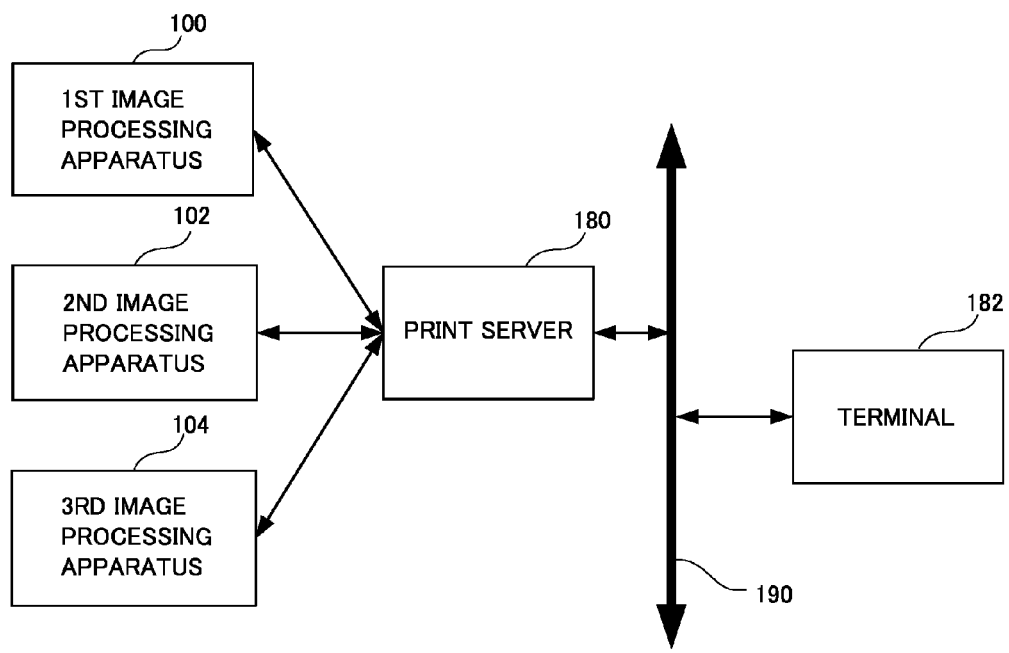
FIG. 10 is a block diagram showing a system configuration different from FIG. 1.

The configuration of image processing system 200 is not limited to that of FIG. 1. By way of example, a plurality of image processing apparatuses 100 to 104 may be connected to print server 180 as shown in FIG. 10.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image processing system, comprising:
   a server computer;
   a plurality of image processing apparatuses communicable with said server computer;
   an information obtaining unit for obtaining information related to power supply/demand situation supplied from outside; and
   a determining unit determining power supply/demand situation, using said information obtained by said information obtaining unit;
   wherein
      said server computer has a function of causing said plurality of image processing apparatuses to execute one job in a shared manner;
      if it is determined by said determining unit that the power supply/demand situation is not tight, said server computer causes said plurality of image processing apparatuses to execute said one job in a shared manner; and
      if it is determined by said determining unit that the power supply/demand situation is tight, said server computer excludes at least one of said plurality of image processing apparatuses and causes the remaining image processing apparatuses to execute said one job in a shared manner.

2. The image processing system according to claim 1, wherein
   if said at least one of said image processing apparatuses receives, with at least part of its functions being in a suspended state, an instruction to execute said one job in a shared manner from said server computer,
   said at least one of said image processing apparatuses transmits unavailability information indicating that sharing of said one job is impossible to said server computer, or
   transmits at least a part of said one job which has been allocated to said at least one of said image processing apparatuses to be executed in a shared manner to at least one of said remaining image processing apparatuses.

3. The image processing system according to claim 2, wherein
   receiving said unavailability information, said server computer causes at least one of said remaining image processing apparatuses to execute a part of said one job which was to be shared by said at least one of said image processing apparatuses that transmitted said unavailability information.

4. The image processing system according to claim 1, wherein
   said at least one of said image processing apparatuses is determined such that total power consumption by said remaining image processing apparatuses does not exceed a prescribed value.

5. The image processing systems according to claim 1, wherein
   each of said plurality of image processing apparatuses suspends at least part of its functions if it is determined by said determining unit that the power supply/demand situation is tight;
   if each of said plurality of image processing apparatuses suspends at least part of its functions and execution of said one job becomes impossible, said server computer temporarily withholds execution of said one job; and
   after at least two of said image processing apparatuses restarted the suspended functions, said server computer causes said image processing apparatuses that restarted the suspended functions to execute said one job in a shared manner.

* * * * *